US 12,076,979 B2

(12) United States Patent
Okada

(10) Patent No.: US 12,076,979 B2
(45) Date of Patent: Sep. 3, 2024

(54) IMAGE FORMING APPARATUS AND IMAGE FORMING METHOD

(71) Applicant: BROTHER KOGYO KABUSHIKI KAISHA, Nagoya (JP)

(72) Inventor: Goro Okada, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 239 days.

(21) Appl. No.: 17/703,237

(22) Filed: Mar. 24, 2022

(65) Prior Publication Data
US 2022/0212482 A1 Jul. 7, 2022

Related U.S. Application Data

(63) Continuation of application No. PCT/JP2020/036237, filed on Sep. 25, 2020.

(30) Foreign Application Priority Data
Sep. 30, 2019 (JP) ................................ 2019-180441

(51) Int. Cl.
*B41J 11/00* (2006.01)
*B41J 2/21* (2006.01)
(Continued)

(52) U.S. Cl.
CPC ......... *B41J 11/0024* (2021.01); *B41J 2/2107* (2013.01); *B41J 3/4078* (2013.01); *C09D 11/328* (2013.01); *D06P 5/30* (2013.01)

(58) Field of Classification Search
CPC .... B41J 11/0024; B41J 2/2107; B41J 3/4078; B41J 2/2114; B41J 2/2117;
(Continued)

(56) References Cited

U.S. PATENT DOCUMENTS

2016/0023454 A1 1/2016 Sloan et al.
2016/0075146 A1* 3/2016 Akiyama ............... B41J 2/2135
347/15
(Continued)

FOREIGN PATENT DOCUMENTS

JP 2011110790 A 6/2011
JP 2016117975 A 6/2016
(Continued)

OTHER PUBLICATIONS

Watanabe, Shinya; Inkjet Ink Set for Textile Printing and Inkjet Textile Printing Method, Aug. 16, 2012, Japan, All Pages (Year: 2012).*

(Continued)

*Primary Examiner* — Justin Seo
*Assistant Examiner* — Tracey M McMillion
(74) *Attorney, Agent, or Firm* — K&L Gates LLP

(57) ABSTRACT

An image forming apparatus includes a supplier and an inkjet head. The supplier supplies, to a medium to be printed, a dye-transfer suppression agent that suppresses a dye or a pigment dyeing chemical fibers constituting the medium to be printed from transferring to a print surface formed on the medium to be printed. At least one of a platen on which the medium to be printed is placed or the supplier is moved to supply the dye-transfer suppression agent to the medium to be printed. The inkjet head ejects ink for forming the print surface to an area to which the dye-transfer suppression agent is supplied.

10 Claims, 11 Drawing Sheets

(51) Int. Cl.
  *B41J 3/407*   (2006.01)
  *C09D 11/328*  (2014.01)
  *D06P 5/30*    (2006.01)

(58) Field of Classification Search
  CPC .... B41J 11/00244; B41J 11/0015; B41J 2/01;
        C09D 11/328; D06P 5/30; B41M 5/00;
        D06B 11/00; D06C 23/00
  See application file for complete search history.

(56) References Cited

U.S. PATENT DOCUMENTS

| | | | |
|---|---|---|---|
| 2016/0176201 A1 | 6/2016 | Kitagawa et al. | |
| 2018/0201025 A1* | 7/2018 | Ohnishi | B41M 5/0023 |
| 2019/0100033 A1 | 4/2019 | Tamaki et al. | |
| 2019/0100047 A1 | 4/2019 | Tamaki et al. | |

FOREIGN PATENT DOCUMENTS

| | | |
|---|---|---|
| JP | 2017530269 A | 10/2017 |
| JP | 2019065421 A | 4/2019 |
| JP | 2019065422 A | 4/2019 |

OTHER PUBLICATIONS

Sloan, In-line Digital Printing System For Textile Materials, Oct. 12, 2017, Japan, All Pages (Year: 2017).*
Office Action issued in related Japanese Patent Application 2019-180441, dated Apr. 25, 2023. (2 pages.).
International Preliminary Report on Patentability for corresponding PCT application PCT/JP2020/036237, dated Apr. 5, 2022.
Written Opinion for corresponding PCT application PCT/JP2020/036237, dated Nov. 10, 2020.
International Search Report for Application No. PCT/JP2020/036237, mailed Nov. 10, 2020 (2 pages).

* cited by examiner

IMAGE FORMING APPARATUS AND IMAGE FORMING METHOD

CROSS-REFERENCE TO RELATED APPLICATION

This is a continuation application of International Application No. PCT/JP2020/036237 filed on Sep. 25, 2020 which claims the benefit of priority from Japanese patent application No. 2019-180441 filed on Sep. 30, 2019. The entire contents of the earlier applications are incorporated herein by reference.

BACKGROUND

When performing printing by ink on a cloth for which dyed chemical fibers are used, a heat treatment is performed so as to fix the ink. At this time, dye-transfer sublimation that dye transfers to an ink layer may occur. In order to suppress the dye-transfer sublimation, an image forming method of forming a dye-transfer sublimation suppression layer including activated carbon on a cloth by screen printing, ejecting ink thereon, and then performing a heat treatment is suggested.

When forming the dye-transfer sublimation suppression layer by screen printing, it is necessary to make a plate for screen printing for each of different images to be printed. Therefore, there is a problem that man-hours and costs are required to make the plates.

SUMMARY

An object of the present disclosure is to provide an image forming apparatus and an image forming method, which enable to print images of various designs while reducing an influence of dye-transfer sublimation.

A first aspect of the present disclosure is an image forming apparatus including a supplier and an inkjet head. The supplier is configured to supply, to a medium to be printed, a dye-transfer suppression agent that suppresses a dye or a pigment dyeing chemical fibers constituting the medium to be printed from transferring to a print surface formed on the medium to be printed. At least one of a platen on which the medium to be printed is placed or the supplier is moved to supply the dye-transfer suppression agent to the medium to be printed. The inkjet head is configured to eject ink for forming the print surface to an area to which the dye-transfer suppression agent is supplied.

In the image forming apparatus, the supplier is configured to eject the dye-transfer suppression agent to the medium to be printed. Thereby, it is possible to print various images while suppressing the dye or the pigment dyeing the chemical fibers from transferring to the print surface formed on the medium to be printed.

A second aspect of the present disclosure is an image forming method performed by an image forming apparatus including a supplier, an inkjet head and a controller. The supplier is configured to supply, to a medium to be printed, a dye-transfer suppression agent that suppresses a dye or a pigment dyeing chemical fibers constituting the medium to be printed from transferring to a print surface formed on the medium to be printed. At least one of a platen on which the medium to be printed is placed or the supplier is moved to supply the dye-transfer suppression agent to the medium to be printed. The inkjet head is configured to eject ink for forming the print surface. The controller performs the steps of causing the dye-transfer suppression agent to be supplied from the supplier to the medium to be printed, and causing ink for forming the print surface to be ejected to an area to which the dye-transfer suppression agent is supplied.

In the image forming method, the supplier is configured to supply the dye-transfer suppression agent to the medium to be printed. Thereby, it is possible to print various images while suppressing the dye or the pigment dyeing the chemical fibers from transferring to the print surface formed on the medium to be printed.

DETAILED DESCRIPTION

Figure 1:
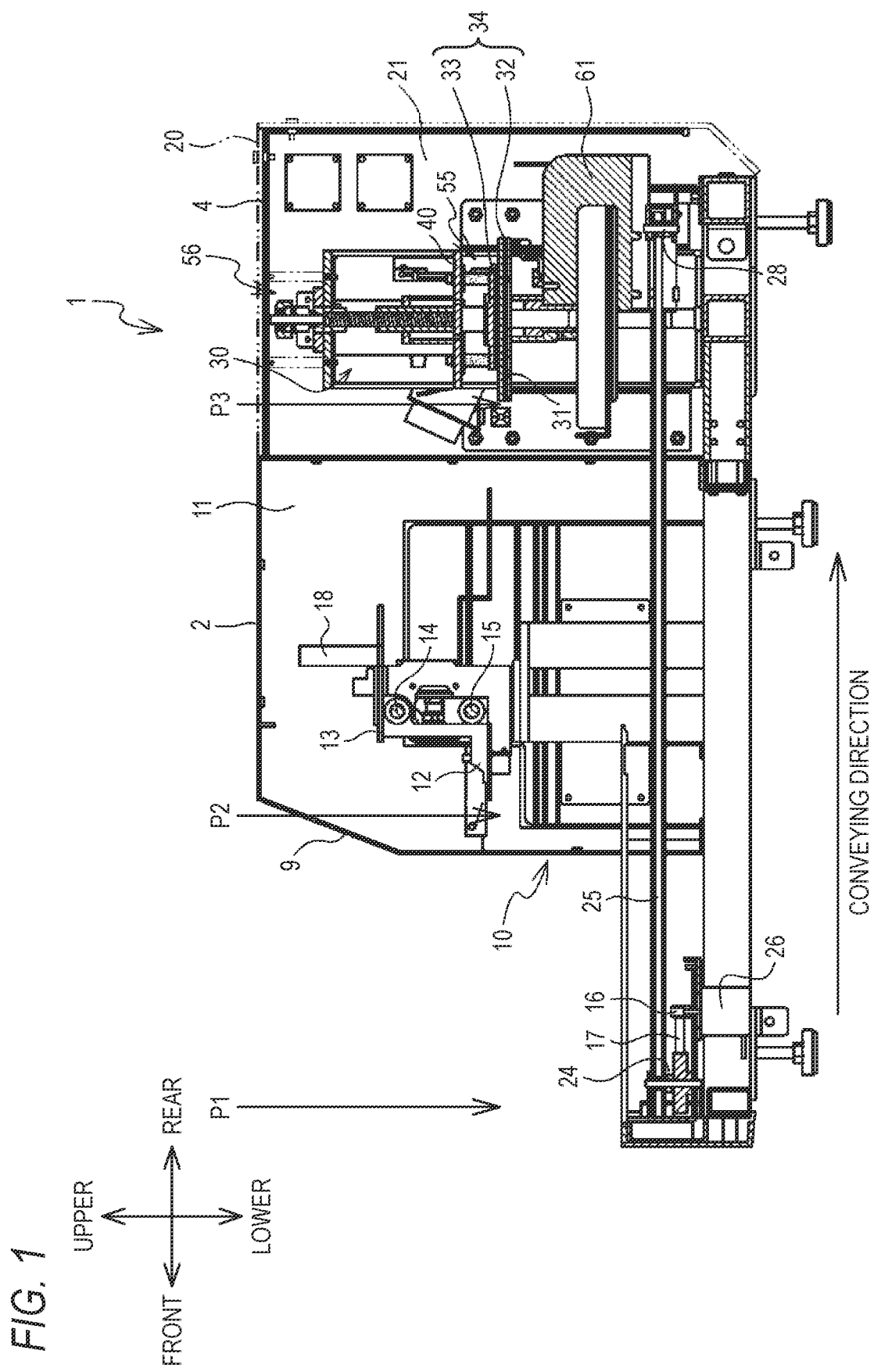
FIG. 1 is a side sectional view of a printing apparatus 1.

A printing apparatus 1 according to a first embodiment of the present disclosure will be described with reference to the drawings. In descriptions below, the right and left, the front and rear, and the upper and lower are indicated using arrows in the drawings. A direction facing from the front toward the rear is hereinafter referred to as "conveying direction".

Structure of Printing Apparatus 1

A structure of a printing apparatus 1 is described with reference to FIG. 1. The printing apparatus 1 includes a printing unit 2, an ink cartridge accommodating unit (not shown), a heater 4, and the like. A front wall of a housing 9 of the printing unit 2 is provided with an opening 10 through which a platen 31 and a medium to be printed such as a fabric placed on the platen 31 can enter and exit.

Figure 3:
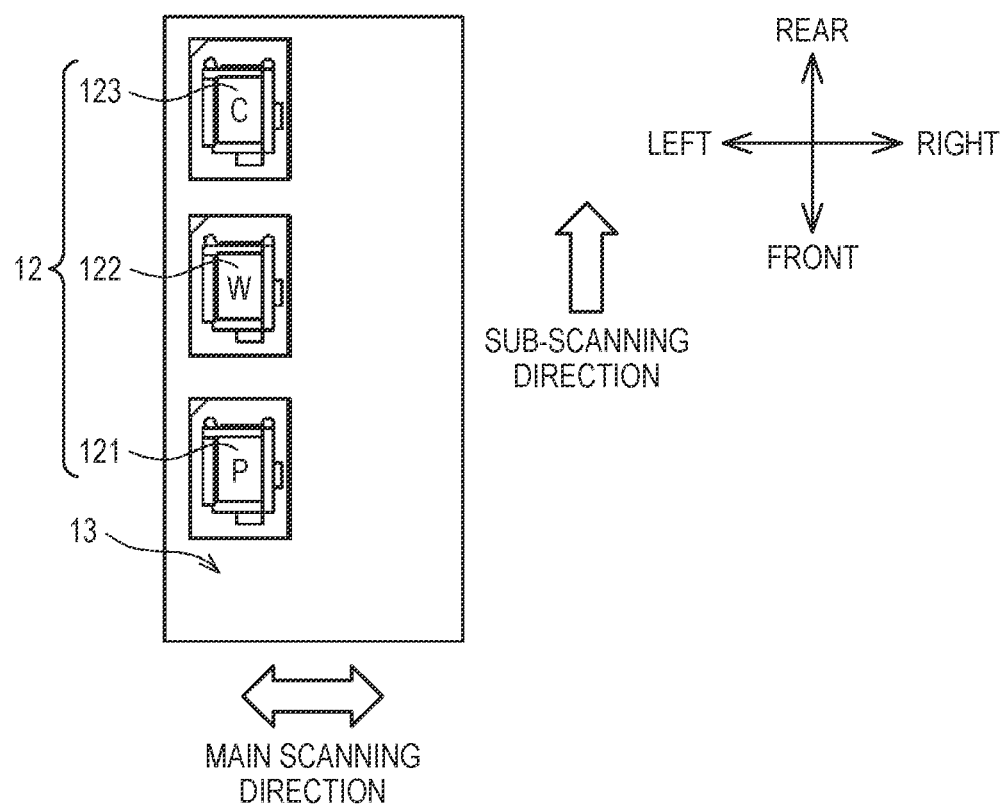
FIG. 3 is a plan view of a carriage 13.

A printing area 11 where printing on the medium to be printed is performed is provided in a part covered by the housing 9 of the printing unit 2. In the printing area 11, a printing head 12 and a carriage 13 are provided, and guide rods 14 and 15 are bridged in the right and left direction (front direction and inner direction on the drawing sheet). As shown in FIG. 3, the printing head 12 includes a pretreatment agent head 121, a white head 122, and a color head 123. The pretreatment agent head 121 is also denoted as 'P' in FIG. 3. The white head 122 is also denoted as 'W' in FIG. 3. The color head 123 is also denoted as 'C' in FIG. 3.

The pretreatment agent head 121, the white head 122, and the color head 123 include a plurality of nozzle alignments in a main scanning direction (right and left direction), respectively. The nozzle alignments of the pretreatment agent head 121 are such that a plurality of nozzles (not shown) for ejecting droplets of a pretreatment agent, which will be described later, is aligned in a sub-scanning direction (front and rear direction). The nozzle alignments of the white head 122 are such that a plurality of nozzles (not shown) for ejecting droplets of white ink (white (W)), which will be described later, is aligned in the sub-scanning direction (front and rear direction). The nozzle alignments of the color head 123 are such that a plurality of nozzles (not shown) for ejecting droplets of color inks of black (B), yellow (Y), cyan (C) and magenta (M), which will be described later, is aligned in the sub-scanning direction (front and rear direction). As shown in FIG. 3, the carriage 13 is configured to mount thereon the pretreatment agent head 121, the white head 122 and the color head 123 from an upstream side toward a downstream side with respect to the sub-scanning direction. In the first embodiment, a dye-transfer suppression agent, which will be described later, is mixed with the pretreatment agent.

As shown in FIG. 1, a carriage motor 18 is provided at a right end portion (an inner portion in the direction of the drawing sheet) of the printing area 11. The carriage 13 is connected to a belt (not shown) extending in parallel to the guide rods 14 and 15. The belt extends between a pulley (not shown) connected to the carriage motor 18 and a pulley (not shown) provided at a left end portion of the printing area 11. Driving the carriage motor 18 causes the carriage 13, on which the printing head 12 is mounted, to move in the main scanning direction (right and left direction) along the guide rods 14 and 15.

The ink cartridge accommodating unit is configured to accommodate a plurality of ink cartridges. The respective ink cartridges store a pretreatment agent including a dye-transfer suppression agent, white ink, and color ink, respectively. The pretreatment agent, the white ink, and the color ink stored in the ink cartridges are supplied to the pretreatment agent head 121, the white head 122, and the color head 123 via a tube (not shown), respectively.

A guide rail (not shown) is provided in the front and rear direction at the center of the printing area 11 and a heating area 21, which will be described later. The guide rail is configured to guide a platen support part 61 configured to support the platen 31 in the front and rear direction. The platen 31 has a plate shape lengthwise in the front and rear direction, as seen from above.

A platen motor 26 is provided near a front end portion of the guide rail. A pulley 16 is fixed to an output shaft of the platen motor 26. A pulley 24 is rotatably supported on a bottom part ahead of the pulley 16. A belt 17 extends over the pulley 16 and the pulley 24. A pulley 28 is rotatably supported below the heating area 21. A belt 25 extends over the pulley 24 and the pulley 28. The platen support part 61 is connected to the belt 25. The pulley 16 is configured to rotate by rotary drive of the platen motor 26. The rotation of the pulley 16 causes the pulley 24 to rotate via the belt 17. The rotation of the pulley 24 is transmitted to the belt 25, so that the platen support part 61 moves in the sub-scanning direction (front and rear direction) along the guide rail.

The heater 4 is provided behind the printing unit 2. A heating area 21 is provided in a housing 20 of the heater 4. A heating mechanism 30 is provided in the heating area 21. The heating mechanism 30 is configured to heat the medium to be printed so as to fix an image printed on the medium to be printed, for example.

Figure 2:
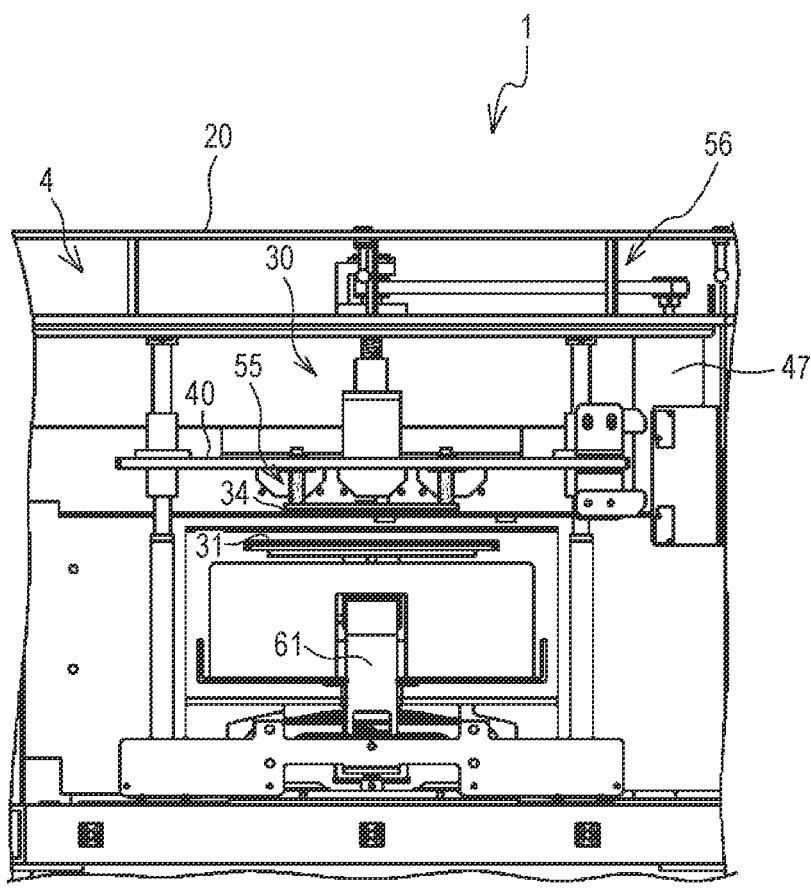
FIG. 2 is a rear view showing an internal structure of a heater 4 of the printing apparatus 1.
Figure 2:
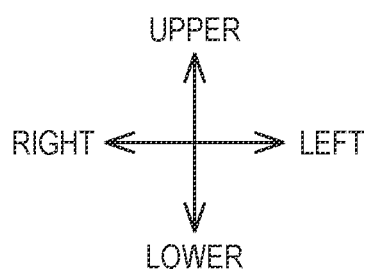

As shown in FIGS. 1 and 2, the heating mechanism 30 includes an intermediate plate 40 at a horizontal posture, a heat press plate 34, an elastic support mechanism 55, an elevating drive mechanism 56, and the like.

The heat press plate 34 includes a heat sheet part 32, a heat insulating plate 33, and the like. The heat insulating plate 33 is fixed to an upper surface of the heat sheet part 32. The heat sheet part 32 includes a heat sheet 32A and a heat storage material (not shown). The heat sheet 32A is a heat generating body in which a nichrome wire is arranged. The heat storage material is an iron member configured to store heat generated by the heat sheet 32A and arranged so as to sandwich the heat sheet 32A therebetween.

The elastic support mechanism 55 is configured to elastically support the heat press plate 34 so as to be slidable in the upper and lower direction with respect to the intermediate plate 40. The elastic support mechanism 55 is respectively provided at each of four corners of the heat insulating plate 33. The elevating drive mechanism 56 is configured to drive up and down the heat press plate 34 so as to come into contact with and to separate from a surface of the medium to be printed placed on the platen 31. The elevating drive mechanism 56 is configured to drive up and down by a rotary drive force of a heat press motor 47 (refer to FIG. 2).

Electrical Configuration of Printing Apparatus 1

Figure 4:
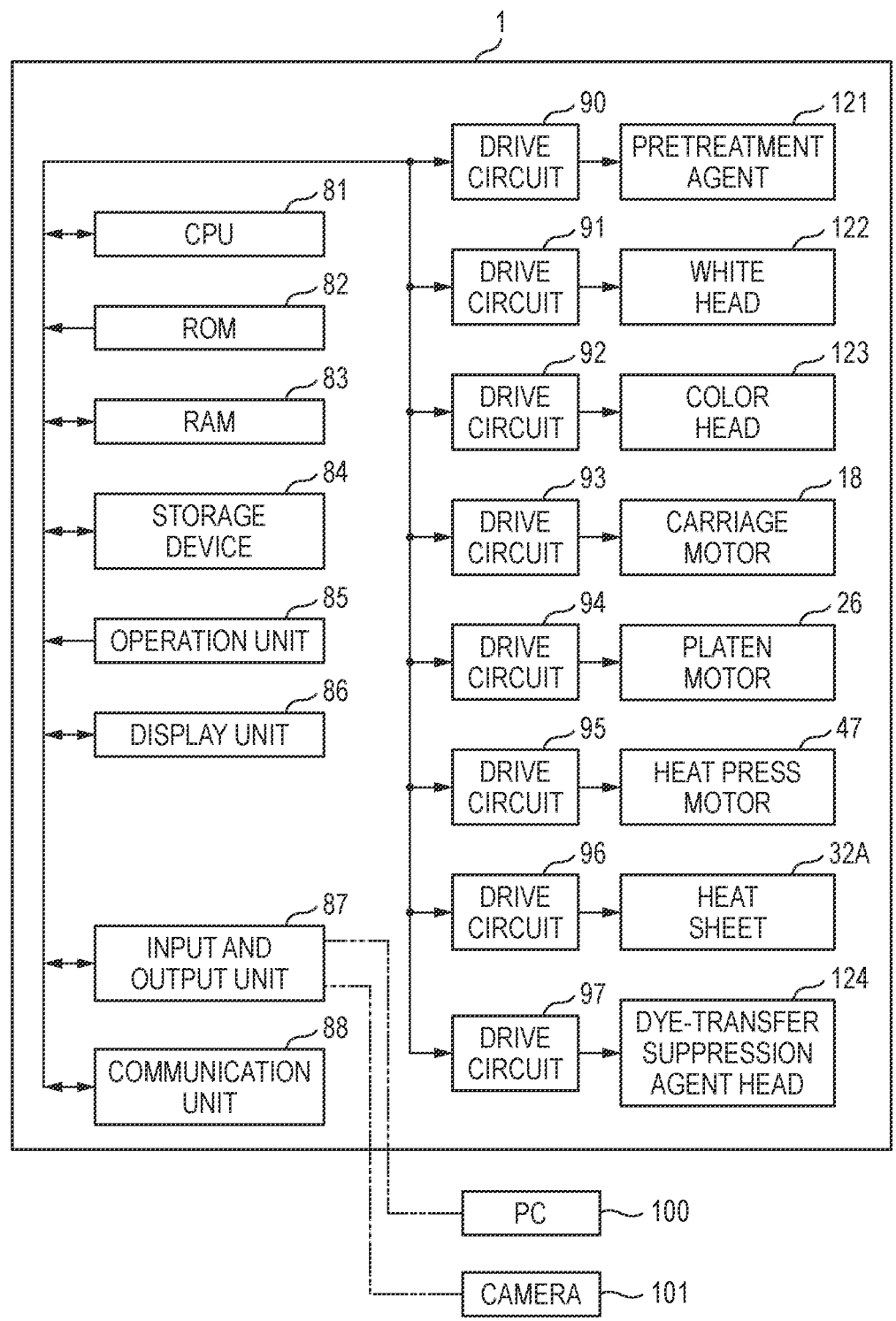
FIG. 4 is a block diagram showing a schematic electrical configuration of the printing apparatus 1.

As shown in FIG. 4, the printing apparatus 1 includes a CPU 81, a ROM 82, a RAM 83, a storage device 84, an operation unit 85, a display unit 86, an input and output unit 87, a communication unit 88, drive circuits 90 to 97, and the like, which are mutually connected via a bus. The CPU 81 is configured to control the printing apparatus 1, to read various programs from the ROM 82, to use the RAM 83 as a working memory, and to execute a variety of processing.

The storage device 84 is a non-volatile storage device such as a flash memory and an HDD. The storage device 84 is configured to store programs for first print processing, second print processing, first dye-transfer suppression agent ejection processing and second dye-transfer suppression agent ejection processing and the like, data of various setting screens, parameters, and the like, which will be described later. The operation unit 85 includes an operation panel and the like (not shown). An operator's instruction is input to the CPU 81 via the operation unit 85. The display unit 86 is configured by a well-known display device or the like. The input and output unit 87 includes an SD memory card slot, a USB (registered trademark) port, and the like. A PC (personal computer) 100, a camera 101 and the like may be connected to the input and output unit 87.

The communication unit 88 has at least one of a wireless module (not shown) and a wired module (not shown), and can be connected to an external apparatus (not shown) such as a terminal apparatus via a network (not shown).

The drive circuit 90 is connected to the pretreatment agent head 121, and is configured, under control of the CPU 81, to eject droplets of the pretreatment agent including a dye-transfer suppression agent from the nozzles. The drive circuit 91 is connected to the white head 122, and is configured, under control of the CPU 81, to eject droplets of the white ink from each nozzle of the white head 122. The drive circuit 92 is connected to the color head 123, and is configured, under control of the CPU 81, to eject droplets of the color ink from each nozzle of the color head 123. The drive circuit 92 is connected to the carriage motor 18, and is configured, under control of the CPU 81, to drive the carriage motor 18. The drive circuit 92 is connected to the platen motor 26, and is configured, under control of the CPU 81, to drive the platen motor 26. The drive circuit 92 is connected to the heat press motor 47, and is configured, under control of the CPU 81, to drive the heat press motor 47. The drive circuit 92 is connected to the heat sheet 32A, and is configured, under control of the CPU 81, to cause the heat sheet 32A to generate heat. Note that, in a case of a second embodiment, which will be described later, the pretreatment agent does not include a dye-transfer suppression agent, and the printing apparatus 1 includes a drive circuit 97 and a dye-transfer suppression agent head 124, in addition to the above-described electrical configuration. The dye-transfer suppression agent head 124 is connected to the drive circuit 97, and is configured, under control of the CPU 81, to eject droplets of the pretreatment agent including a dye-transfer suppression agent from the nozzles. In the first embodiment, the drive circuit 97 and the dye-transfer suppression agent head 124 are not necessary.

Pretreatment Agent

The pretreatment agent is a base coating agent that is applied before ink is applied to a fabric 3 (refer to FIGS. 6 and 7) that is a medium to be printed. As an example, a multivalent metal salt ($CaCl_2$, $Ca(NO_2)_2$ and the like) is included to make an expressed color of the ink vivid.

Dye-Transfer Sublimation

When performing printing by ink on a cloth for which dyed chemical fibers, particularly, polyester fibers are used, a heat treatment is performed so as to fix the ink. At this time, the heat treatment may cause a sublimation phenomenon in the dye dyeing the fibers, resulting in dye-transfer sublimation that the dye transfers to an ink layer. In order to solve this problem, a method of lowering a temperature of the heat treatment and performing the fixing is considered. However, when the temperature of the heat treatment is lowered, the fixing may become insufficient, resulting in a problem that an abrasion resistance of a coating film surface of the ink is lowered. Therefore, in the present embodiment, the dye-transfer suppression agent is ejected to the fabric 3.

Dye-Transfer Suppression Agent

In the first embodiment, in order to suppress dye-transfer sublimation, the pretreatment agent including the dye-transfer suppression agent is ejected from the pretreatment agent head 121 to the fabric 3. The dye-transfer suppression agent includes, for example, a porous member, a resin component, glycols, water, and a surfactant. Examples of the porous member include activated carbon, zeolite, MOF (METAL Organic Frameworks), or the like. Since activated carbon is porous, it has a large surface area for its volume and has an adsorption property of adsorbing a lot of substances. Zeolite also has a porous structure, has extremely small continuous cavities, and thus has an adsorption property. MOF is an artificially synthesized porous body and has an excellent adsorption property. A content of the porous member in the dye-transfer suppression agent is, for example, 5% to 20%. The dye-transfer suppression agent may be colored, and for example, the dye-transfer suppression agent including activated carbon is gray. In addition, the dye-transfer suppression agent including zeolite is milky white. Further, the porous member including MOF is blue when the MOF includes copper or iron. The porous member included in the dye-transfer suppression agent adsorbs the dye dyeing the fibers when dye-transfer sublimation occurs, and suppresses the dye from transferring to the ink surface. In addition, the porous member can suppress the pigment dyeing the fibers from transferring to a print surface. An example of an average particle size of activated carbon when the porous member is activated carbon is described. For example, WO2019/131209 discloses activated carbon having an average particle size of 20 μm or smaller ([0051] paragraph]. The average particle size of activated carbon may be equal to or smaller than a nozzle diameter of the pretreatment agent head 121. An example of the resin component is a binder resin. A content of the binder resin in the dye-transfer suppression agent is, for example, 5% to 20%. The binder resin suppresses the ejected dye-transfer suppression agent from being peeled off due to washing of the fabric 3, and enhances washing resistance. Examples of the binder resin include urethane, acrylic, styrene, or the like. The binder resin may also be a water-soluble emulsion. An example of glycols is glycerin. The pretreatment agent suppresses fluffing of the fabric 3 and also suppresses ink spreading.

First Print Processing

First print processing of the printing apparatus 1 is described with reference to FIG. 5. In the first print processing, as shown in FIG. 6, it is premised that the pretreatment agent head 121, the white head 122, and the color head 123 are arranged in the sub-scanning direction on the carriage 13 and the pretreatment agent head 121 ejects droplets of the pretreatment agent including the dye-transfer suppression agent. First, when the platen 31 is located at a set position P1 shown in FIG. 1, the operator sets the fabric 3, which is an example of the medium to be printed, on the platen 31. An example of the fabric 3 is a shirt made of polyester. When the CPU 81 detects that a predetermined operation has been performed via the operation unit 85 by the operator, the CPU 81 reads a first print processing program from the ROM 82 and executes the first print processing. In addition, when the CPU 81 receives an instruction to start printing from the PC 100, the CPU 81 also starts the first print processing.

Figure 5:
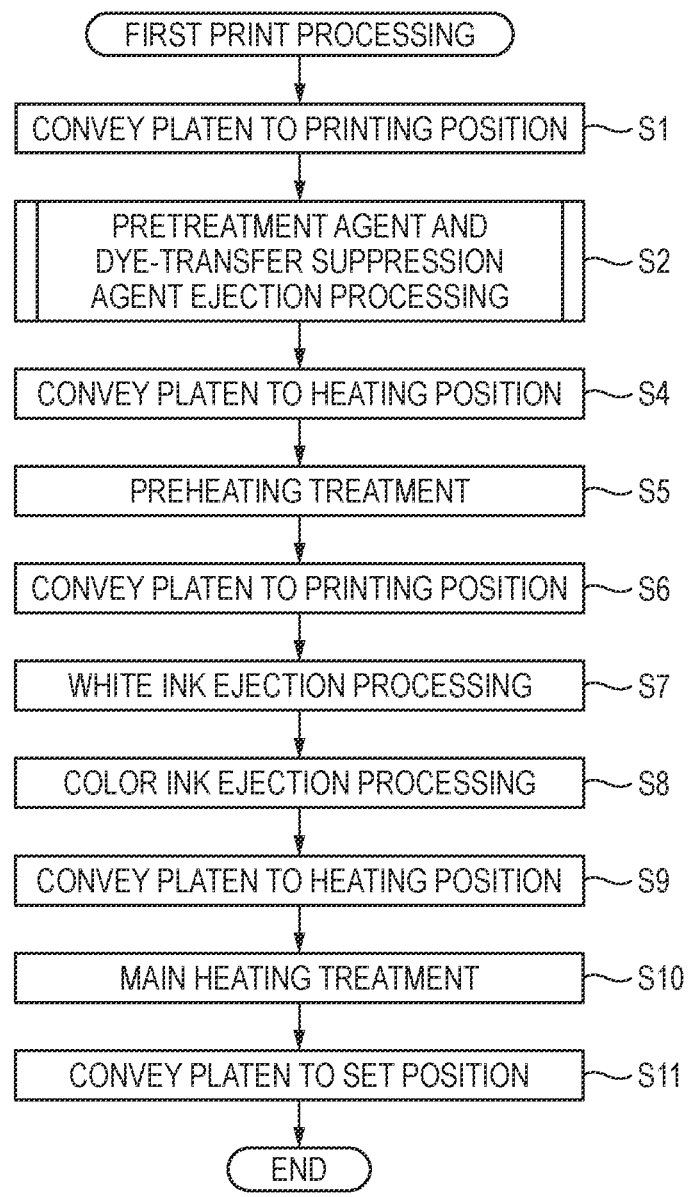
FIG. 5 is a flowchart of first print processing.
Figure 6:
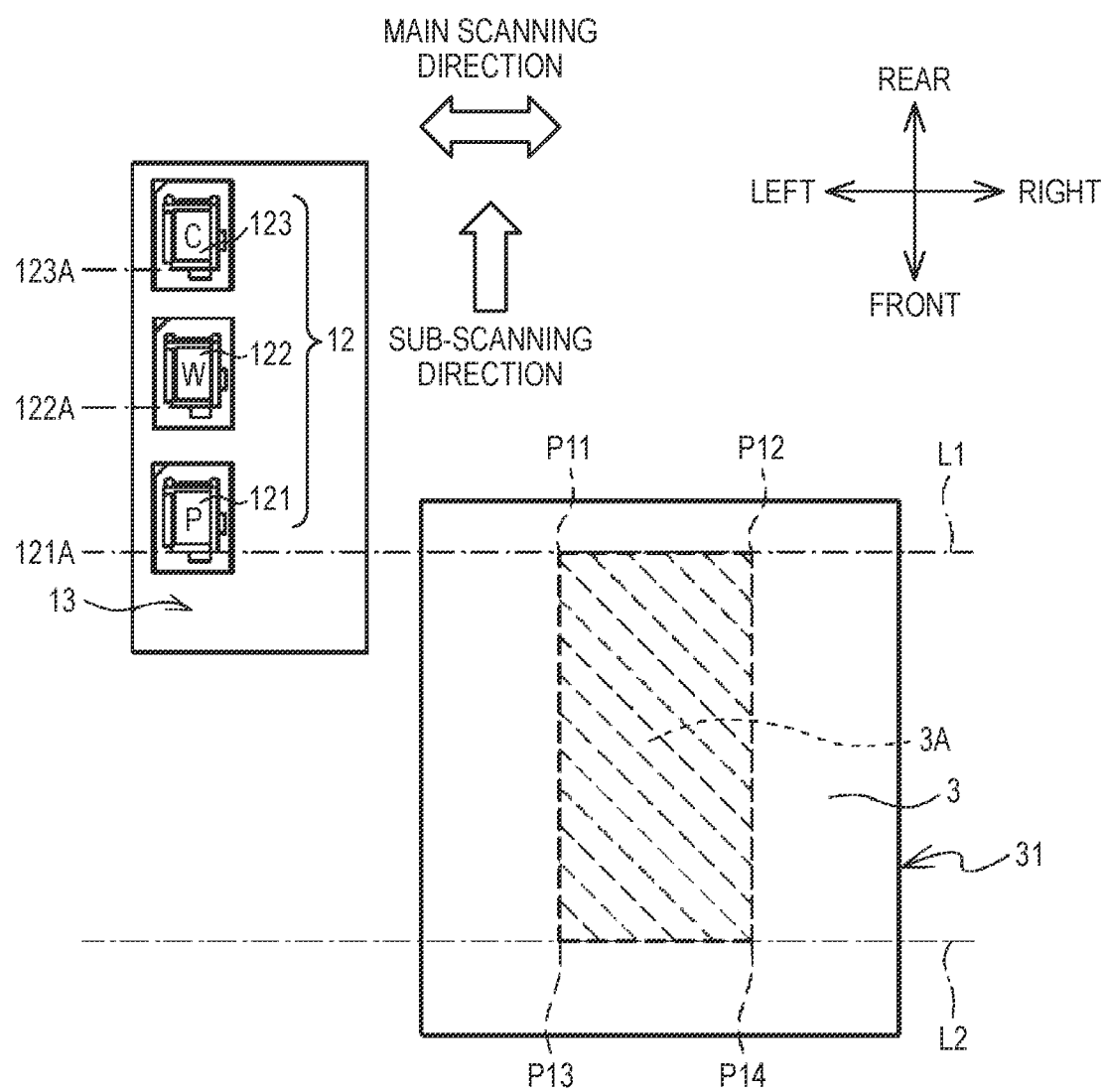
FIG. 6 is a plan view showing arrangement of the carriage 13 and a fabric 3.

As shown in FIG. 5, the CPU 81 first drives the platen motor 26 via the drive circuit 94 to convey the platen 31 on which the fabric 3 is placed from the set position P1 (refer to FIG. 1) to a printing position P2 (refer to FIG. 1) (S1). The printing position P2 is a position where the platen 31 reaches directly below the pretreatment agent head 121. As shown in FIG. 6, the fabric 3 is placed at a predetermined position on the platen 31. It is assumed that an image is printed in a rectangular area 3A having P11, P12, P13, and P14 as apexes on the fabric 3. In this case, an area to which the white ink is ejected is the area 3A. In addition, an area to which the color ink is ejected is also the area 3A. The CPU 81 moves the platen 31 to a scanning position L1 including the position P11, which is an ejection start position of the pretreatment agent by the pretreatment agent head 121. At this time, a front end 121A of the pretreatment agent head 121 is located at the scanning position L1.

Next, the CPU 81 executes ejection processing of the pretreatment agent and the dye-transfer suppression agent (S2). The CPU 81 moves the carriage 13 rightward, and ejects the pretreatment agent including the dye-transfer suppression agent from the pretreatment agent head 121 to the area 3A where the pretreatment agent and the dye-transfer suppression agent need to be applied. The CPU 81 sequentially moves the platen 31 rearward, reciprocally moves the carriage 13 in the main scanning direction (right and left direction), and ejects the pretreatment agent from the pretreatment agent head 121. When the ejection of the pretreatment agent up to the position P14 is completed, the CPU 81 ends the ejection of the pretreatment agent from the pretreatment agent head 121. An amount of ejection of the dye-transfer suppression agent included in the pretreatment agent is a predetermined specified amount. Note that, when an instruction to perform first dye-transfer suppression agent ejection processing (refer to FIG. 9) or second dye-transfer suppression agent ejection processing (FIG. 10), which will be described later, to change the amount of ejection of the dye-transfer suppression agent has been input from the operation unit 85, the CPU 81 executes a subroutine of the first dye-transfer suppression agent ejection processing or the second dye-transfer suppression agent ejection processing, in the processing of S2.

Next, the CPU 81 conveys the platen 31 to a heating position P3 (S4). As shown in FIG. 1, the heating position P3 is a position in the heater 4 where the platen 31 reaches directly below the heat press plate 34. When the platen 31 reaches the heating position, the CPU 81 performs a preheating treatment (S5). The preheating treatment is a treatment for fixing the pretreatment agent and the dye-transfer suppression agent. For example, the CPU 81 drives the heat press motor 47 (refer to FIG. 4) via the drive circuit 95 (refer to FIG. 4) to push down the heat press plate 34 (refer to FIG. 2) toward the platen 31, thereby bringing the heat press plate 34 into contact with the fabric 3 (refer to FIG. 6). The CPU 81 causes the heat sheet 32A to generate heat for a predetermined time for preheating, via the drive circuit 96. An example of the predetermined time is within 30 seconds. Thereafter, the CPU 81 drives the heat press motor 47 (refer to FIG. 4) to move the heat press plate 34 (refer to FIG. 2) upward.

Next, the CPU 81 drives the platen motor 26 to convey the platen 31 from the heating position P3 (refer to FIG. 1) to the printing position P2 (refer to FIG. 1) (S6). Next, the CPU 81 executes white ink ejection processing (S7). For example, the CPU 81 moves the platen 31 to a position where a front end portion 122A of the white head 122 coincides with the scanning position L1 including the position P11, which is an ejection start position of the white ink by the white head 122. Next, the CPU 81 moves the carriage 13 rightward, and ejects the white ink from the white head 122 to the area 3A (S7). The CPU 81 sequentially moves the platen 31 rearward, reciprocally moves the carriage 13 in the main scanning direction (right and left direction), and ejects the white ink by the white head 122. When the ejection of the white ink up to the position P14 is completed, the CPU 81 ends the ejection of the white ink from the white head 122.

Next, the CPU 81 executes color ink ejection processing (S8). For example, the CPU 81 moves the platen 31 to a position where a front end portion 123A of the color head 123 coincides with the scanning position L1 including the position P11, which is an ejection start position of the color ink by the color head 123. Next, the CPU 81 moves the carriage 13 rightward, and ejects the color ink from the color head 123 to the area 3A (S8). The CPU 81 sequentially moves the platen 31 rearward, reciprocally moves the carriage 13 in the main scanning direction (right and left direction), and ejects the color ink by the color head 123. When the ejection of the color ink up to the position P14 is completed, the CPU 81 ends the ejection of the color ink from the color head 123. Note that, during a period after the front end portion 123A of the color head 123 reaches the scanning position L1 shown in FIG. 6 until the front end portion 122A of the white head 122 reaches the scanning position L2, the CPU 81 may perform the white ink ejection processing (S7) and the color ink ejection processing (S8) at the same time. In addition, the CPU 81 may move the platen 31 to a position where the scanning position L2 including the position P13 is directly below the white head 122, sequentially move the platen 31 forward, reciprocally move the carriage 13 in the main scanning direction (right and left direction) and cause the white head 122 to eject the white ink. Similarly, the CPU may move the platen 31 to a position where the scanning position L2 including the position P13 is directly below the color head 123, sequentially move the platen 31 forward, reciprocally move the carriage 13 in the main scanning direction (right and left direction) and cause the color head 123 to eject the color ink.

Next, the CPU 81 conveys the platen 31 to the heating position P3 (S9). Since the processing of S9 is similar to the processing of S4, the description thereof is omitted. When the platen 31 reaches the heating position P3, the CPU 81 performs a main heating treatment (S10). The main heating treatment is processing of fixing the white ink and color ink ejected on the fabric 3. For example, the CPU 81 drives the heat press motor 47 (refer to FIG. 4) via the drive circuit 95 (refer to FIG. 4) to push down the heat press plate 34 (refer to FIG. 2) toward the platen 31, thereby bringing the heat press plate 34 into contact with the fabric 3. The CPU 81 causes the heat sheet 32A to generate heat for a predetermined time for main heating longer than the preheating treatment, via the drive circuit 96. An example of the predetermined time is within 10 minutes. Thereafter, the CPU 81 drives the heat press motor 47 (refer to FIG. 4) to move the heat press plate 34 (refer to FIG. 2) upward. Note that, in the preheating treatment and the main heating treatment, the CPU 81 may cause the heat sheet 32A to generate heat before pushing down the heat press plate 34 toward the platen 31.

Next, the CPU 81 drives the platen motor 26 to convey the platen 31 to the set position P1 (S11). At the set position P1, the operator removes the fabric 3 from the platen 31.

Second Embodiment

Figure 7:
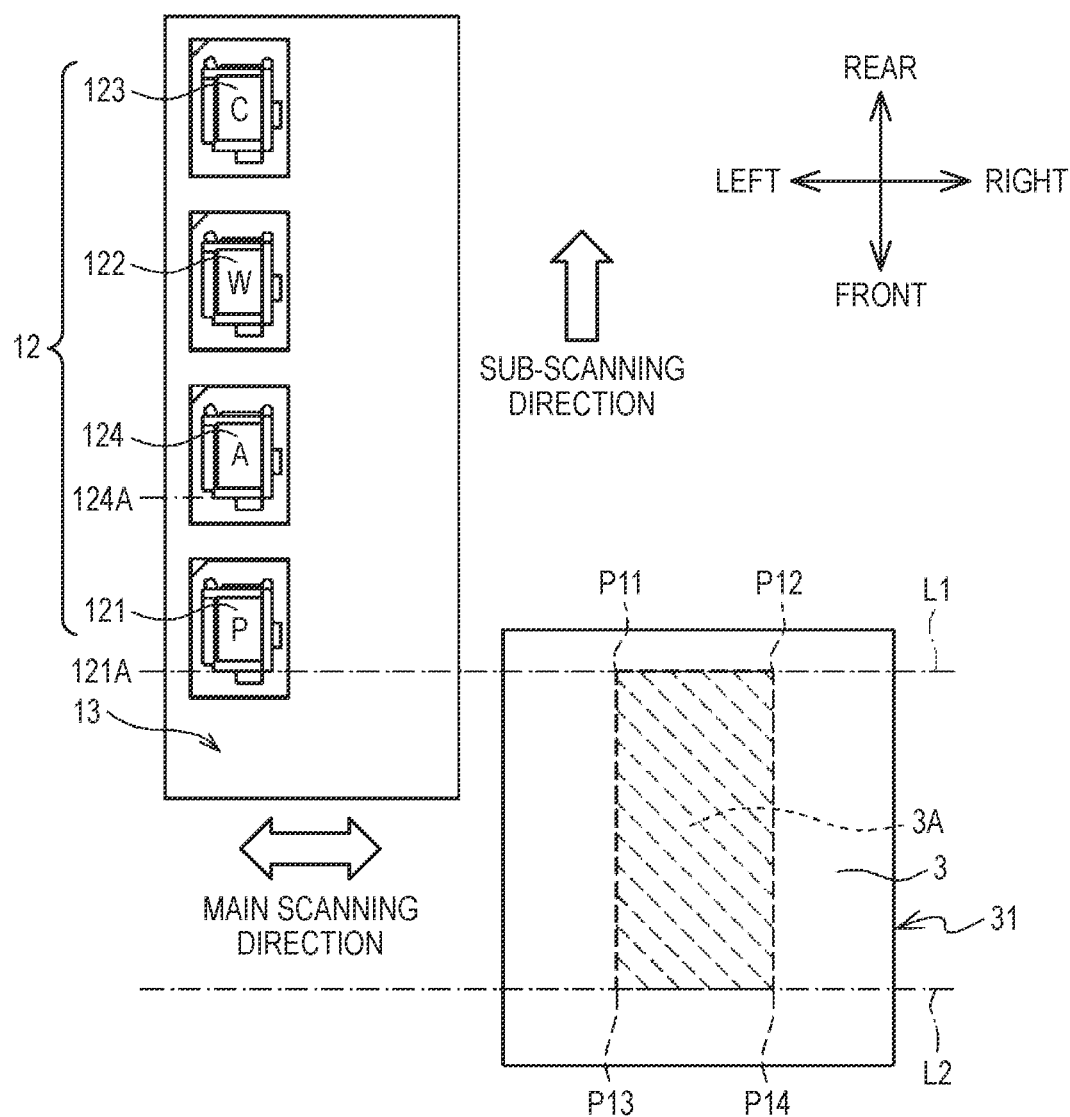
FIG. 7 is a plan view showing arrangement of the carriage 13 and the fabric 3.
Figure 8:
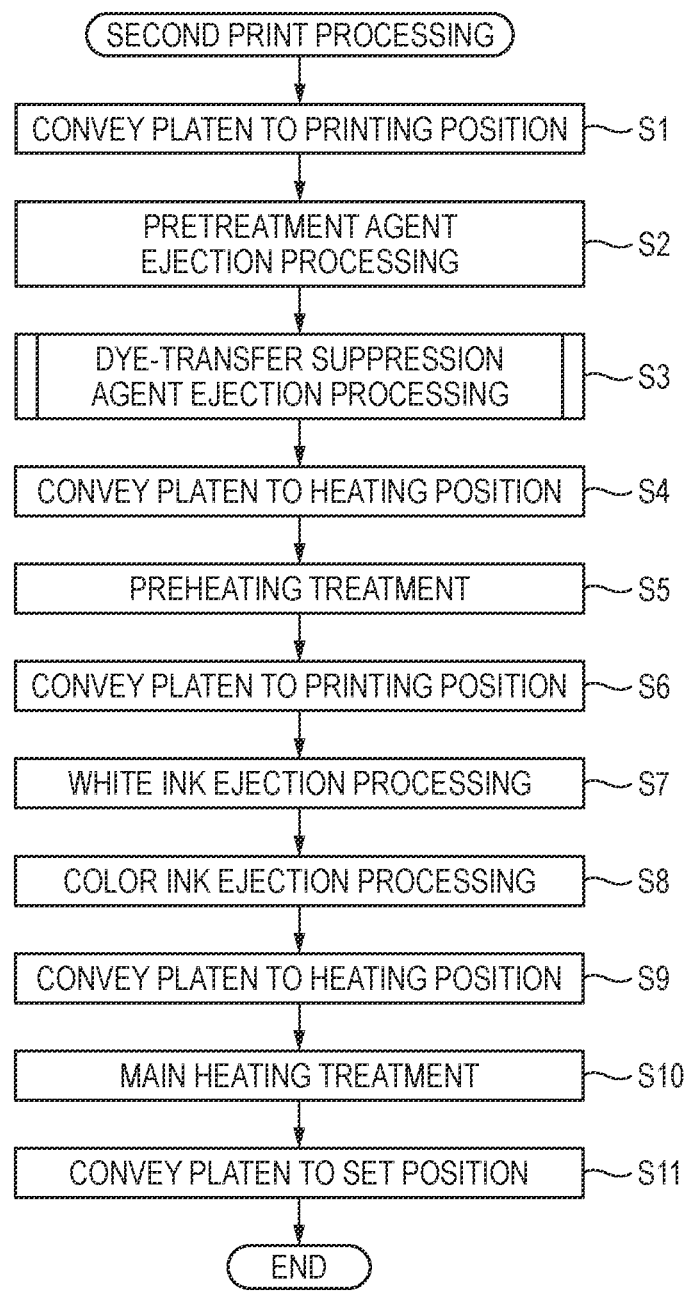
FIG. 8 is a flowchart of second print processing.

Next, a second embodiment of the present disclosure is described with reference to FIGS. 7 and 8. In the second embodiment, the pretreatment agent does not include a dye-transfer suppression agent, and the dye-transfer suppression agent is ejected from the dye-transfer suppression agent head 124 provided with nozzles for ejecting the dye-transfer suppression agent. For example, as shown in FIG. 7, the carriage 13 is configured to mount thereon the pretreatment agent head 121, the dye-transfer suppression agent head 124, the white head 122 and the color head 123 from an upstream side toward a downstream side with respect to the sub-scanning direction. The dye-transfer suppression agent head 124 is also denoted as 'A' in FIG. 7.

When the CPU 81 detects that a predetermined operation has been performed via the operation unit 85 by the operator or when an instruction to start printing is received from the PC 100, the CPU 81 reads a second print processing program from the ROM 82 and executes the second print processing.

Second Print Processing

In the second print processing, since the processing of S1 and S4 to S11 is the same as the processing of S1 and S4 to S11 of the first print processing, only processing of S2 and S3 is described. When the CPU 81 conveys the platen 31 to the printing position P2 (refer to FIG. 1) (S1), the CPU 81 executes pretreatment agent ejection processing (S2). For example, the CPU 81 moves the platen 31 to the scanning position L1 including the position P11, which is an ejection start position of the pretreatment agent by the pretreatment agent head 121. At this time, the front end 121A of the pretreatment agent head 121 is located at the scanning position L1. Next, the CPU 81 moves the carriage 13 rightward, and ejects the pretreatment agent from the pretreatment agent head 121 to the area 3A. The CPU 81 sequentially moves the platen 31 rearward, reciprocally moves the carriage 13 in the main scanning direction (right and left direction), and ejects the pretreatment agent from the pretreatment agent head 121. When the ejection of the pretreatment agent up to the position P14 is completed, the CPU 81 ends the ejection of the pretreatment agent from the pretreatment agent head 121.

Next, the CPU 81 executes dye-transfer suppression agent ejection processing (S3). For example, the CPU 81 moves the platen 31 to a position where a front end portion 124A of the dye-transfer suppression agent head 124 coincides with the scanning position L1 including the position P11, which is an ejection start position of the dye-transfer suppression agent by the dye-transfer suppression agent head 124. Next, the CPU 81 moves the carriage 13 rightward, and ejects the dye-transfer suppression agent from the dye-transfer suppression agent head 124 to the area 3A. The CPU 81 sequentially moves the platen 31 rearward, reciprocally moves the carriage 13 in the main scanning direction (right and left direction), and ejects the dye-transfer suppression agent from the dye-transfer suppression agent head 124. When the ejection of the dye-transfer suppression agent up to the position P14 is completed, the CPU 81 ends the ejection of the dye-transfer suppression agent from the dye-transfer suppression agent head 124. Note that, the CPU 81 may move the platen 31 to a position where the scanning position L2 including the position P13 is directly below the dye-transfer suppression agent head 124, sequentially move the platen 31 forward, reciprocally move the carriage 13 in the main scanning direction (right and left direction) and cause the dye-transfer suppression agent head 124 to eject the dye-transfer suppression agent. An amount of ejection of the dye-transfer suppression agent is a predetermined specified amount. Note that, when an instruction to perform first dye-transfer suppression agent ejection processing (refer to FIG. 9) or second dye-transfer suppression agent ejection processing (FIG. 10), which will be described later, to change the amount of ejection of the dye-transfer suppression agent has been input from the operation unit 85, the CPU 81 executes a subroutine of the first dye-transfer suppression agent ejection processing or the second dye-transfer suppression agent ejection processing, in the processing of S3.

Figure 9:
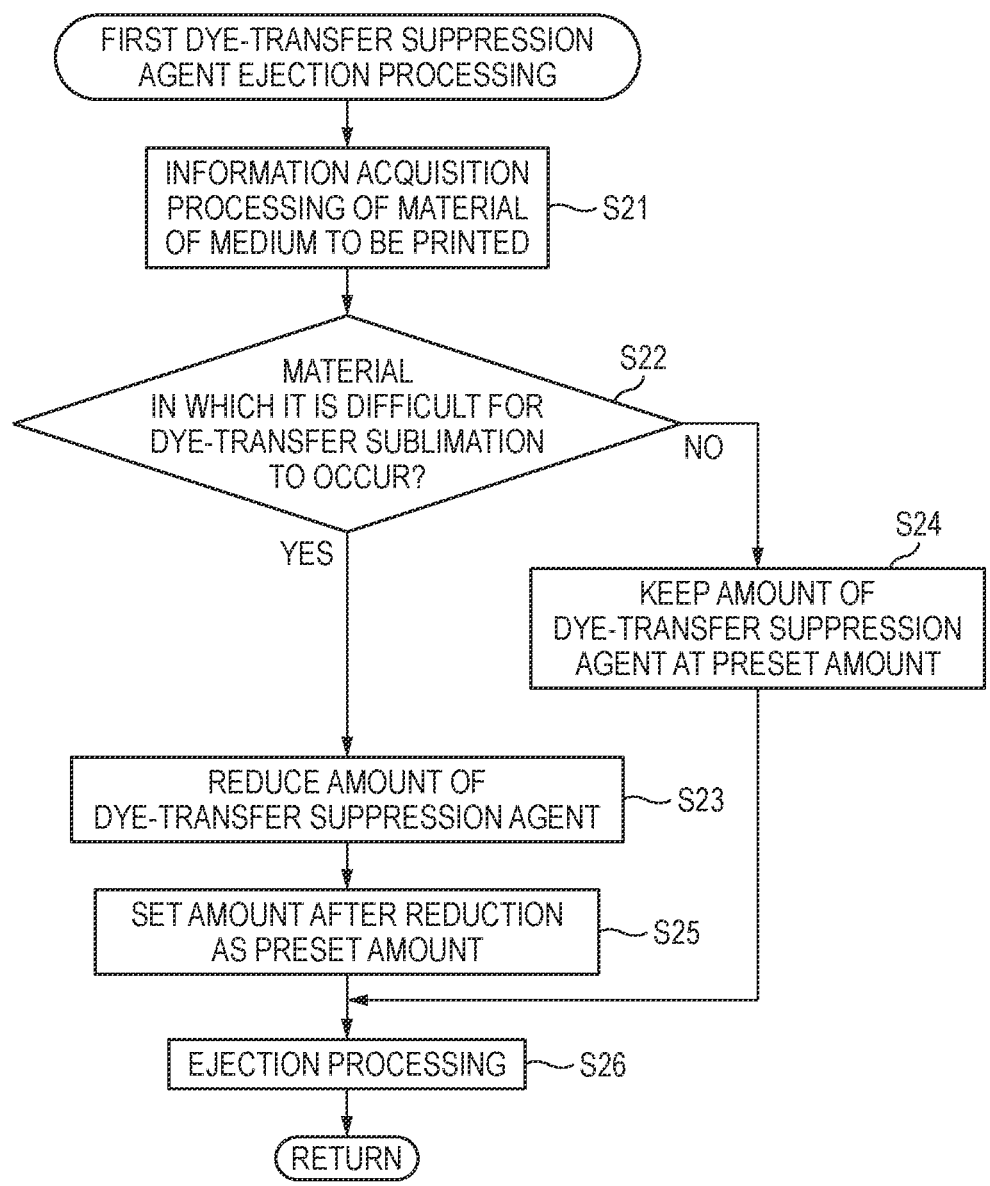
FIG. 9 is a sub-routine of first dye-transfer suppression agent ejection processing.
Figure 10:
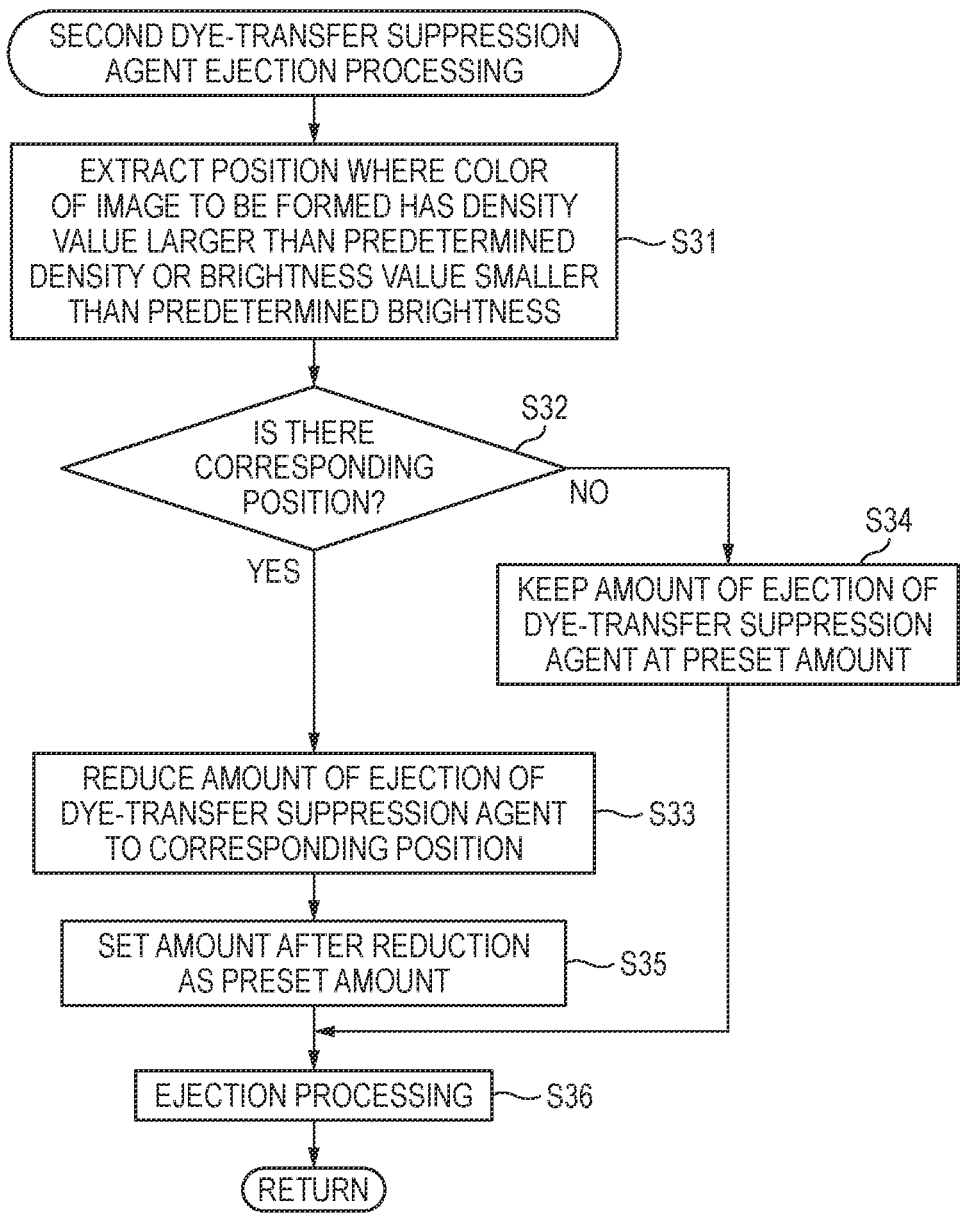
FIG. 10 is a sub-routine of second dye-transfer suppression agent ejection processing.

Next, the first dye-transfer suppression agent ejection processing shown in FIG. 9 and the second dye-transfer suppression agent ejection processing shown in FIG. 10 are described. The first dye-transfer suppression agent ejection processing and the second dye-transfer suppression agent ejection processing are processing of changing an amount of ejection of the dye-transfer suppression agent to be ejected, in the processing of S2 of the first print processing and the processing of S3 of the second print processing. The CPU 81 may execute at least one of the first dye-transfer suppression agent ejection processing and the second dye-transfer suppression agent ejection processing, as a subroutine of the processing of S2 of the first print processing and the processing of S3 of the second print processing. The CPU 81 may also execute at least one of the first dye-transfer suppression agent ejection processing except S26 and the second dye-transfer suppression agent ejection processing except S36 in advance before the first print processing or the second print processing.

When the CPU 81 starts the first dye-transfer suppression agent ejection processing shown in FIG. 9, the CPU 81 first executes information acquisition processing (S21) of the material of the fabric 3. For example, the CPU 81 acquires information on the material of the medium to be printed input from the operation unit 85. Examples of the information on the material include a type of the material, a color of the material, a dyeing method of the material, and the like. Examples of the type of the material include polyester, nylon, acrylic, other chemical fibers, cotton, and other natural fibers. Examples of a material in which it is easy for dye-transfer sublimation to occur include polyester. Examples of a material in which it is difficult for dye-transfer sublimation to occur include cotton or other natural fibers. Examples of the color of the material include a color in which it is difficult for dye-transfer sublimation to occur, and other colors. Examples of a color in which it is easy for dye-transfer sublimation to occur include red or black. Examples of the dyeing method of the material include cation dyeing and other dyeing methods. The cation dyeing is a dyeing method in which it is difficult for dye-transfer sublimation to occur. In the storage device 84, a type of a material, a color of a material, and a dyeing method of a material in which it is difficult for dye-transfer sublimation to occur and a type of a material type, a color of a material, and a dyeing method of a material in which it is easy for dye-transfer sublimation to occur, which are input in advance by the operator, are stored.

Next, the CPU 81 determines whether the fabric 3 is a material in which it is difficult for dye-transfer sublimation to occur, based on the information acquired in the processing of S21 (S22). For example, in the determination processing of S22, the CPU 81 determines whether the type of the material acquired in the processing of S21 is stored in the storage device 84 as a material in which it is difficult for dye-transfer sublimation to occur. When it is determined that the fabric is a material in which it is difficult for dye-transfer sublimation to occur (S22: YES), the CPU 81 reduces an amount of the dye-transfer suppression agent, as compared to a preset amount (S23). The amount to be reduced is set in advance. The CPU 81 sets an amount of ejection of the dye-transfer suppression agent after reduction as a specified amount (S25). In addition, when it is not determined that the fabric is a material in which it is difficult for dye-transfer sublimation to occur (S22: NO), the CPU 81 keeps the amount of the dye-transfer suppression agent at a preset value (S24). Thereafter, the CPU 81 executes the dye-transfer suppression agent ejection processing (S26), and ends the first dye-transfer suppression agent ejection processing.

Next, the second dye-transfer suppression agent ejection processing is described with reference to FIG. 10. First, the CPU 81 extracts a position where a color of an image to be formed in the area 3A of the fabric 3 has a density value larger than a predetermined density or a brightness value smaller than a predetermined brightness, based on print data stored in the RAM 83 (S31). The print data is received in advance from the PC 100 or an external memory connected to the input and output unit 87 by the CPU 81 before the first print processing and the second print processing, and is stored in the RAM 83. The print data is data of an image that is printed on the fabric 3. For the density value, for example, a saturation may be used. For the brightness value, a color value (L value) may be used. When there is a position where the density value is large or the brightness value is small (S32: YES), the CPU 81 reduces an amount of ejection of the dye-transfer suppression agent to the corresponding position, as compared to the preset value (S33). The amount to be reduced is set in advance. The CPU 81 sets an amount of ejection of the dye-transfer suppression agent after reduction as a specified amount (S35). When it is not determined that there is a position where the density value is large or the brightness value is small (S32: NO), the CPU 81 keeps the amount of the dye-transfer suppression agent at a preset amount (S34). Thereafter, the CPU 81 executes the dye-transfer suppression agent ejection processing (S36), and ends the second dye-transfer suppression agent ejection processing. Therefore, in the ejection processing (S26, S36), the CPU 81 can change the amount of ejection of the dye-transfer suppression agent at each ejection timing of the dye-transfer suppression agent in the area 3A having the apexes P11 to P14.

Third Embodiment

Figure 11:
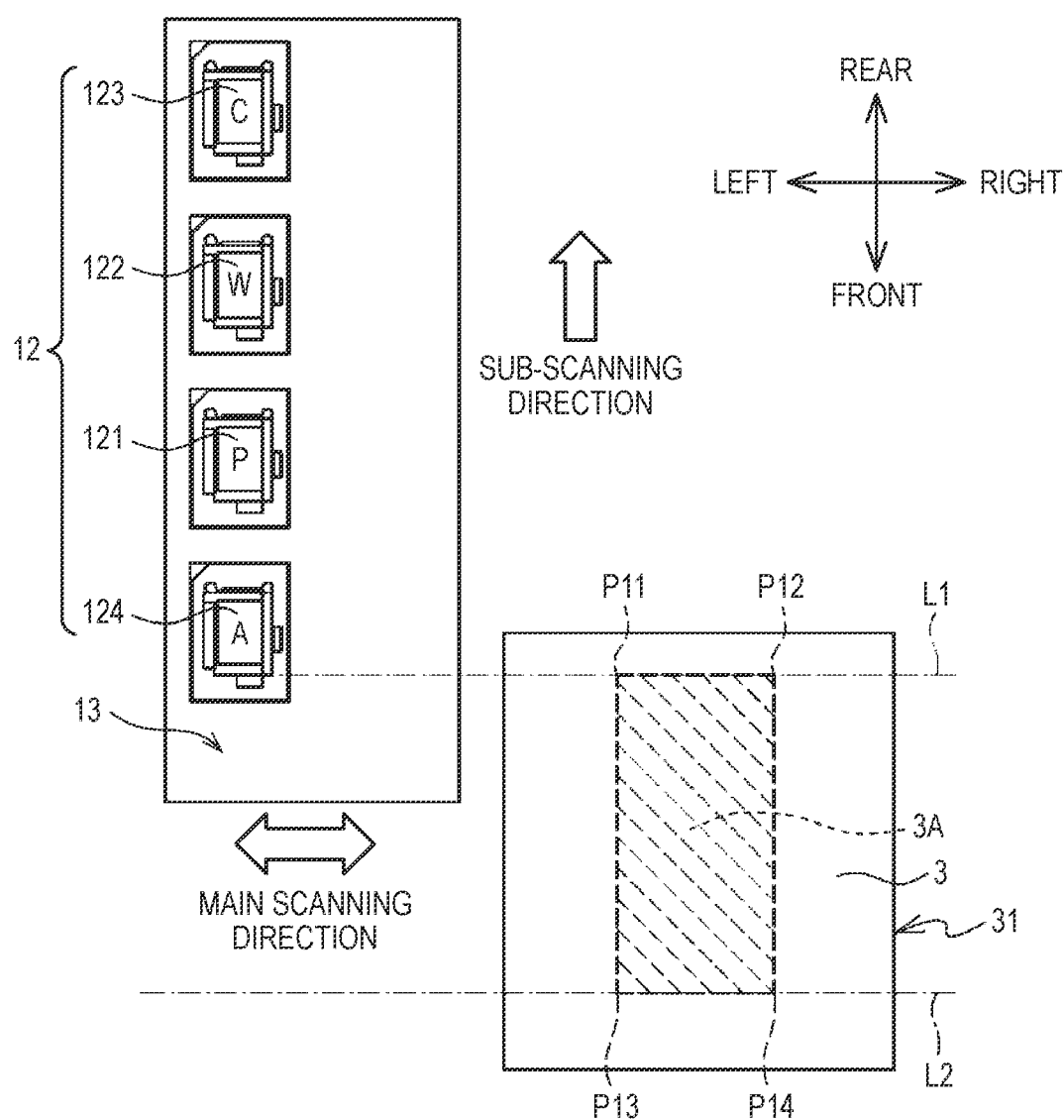
FIG. 11 is a plan view showing arrangement of the carriage 13 and the fabric 3.

Next, a third embodiment of the present disclosure is described with reference to FIG. 11. In the third embodiment, the alignment of the heads on the carriage 13 is different from the second embodiment shown in FIG. 7. As shown in FIG. 11, the carriage 13 of the third embodiment is configured to mount thereon the dye-transfer suppression agent head 124, the pretreatment agent head 121, the white head 122 and the color head 123 from the upstream side toward the downstream side with respect to the sub-scanning direction. Therefore, in the third embodiment, the dye-transfer suppression agent is first ejected from the dye-transfer suppression agent head 124 to the area 3A of the fabric 3, the pretreatment agent is ejected from the pretreatment agent head 121 to the area 3A, the white ink is ejected from the white head 122 to the area 3A, and then the color ink is ejected from the color head 123 to the area 3A. The other processing is the same as the second embodiment. Note that, the positional relationship between the dye-transfer suppression agent head 124 and the pretreatment agent head 121 on the carriage 13 is not necessarily limited to that shown in FIG. 11. For example, the white head 122, the color head 123, the dye-transfer suppression agent head 124, and the pretreatment agent head 121 may be arranged in corresponding order from the upstream side to the downstream side with respect to the sub-scanning direction. In addition, the white head 122, the color head 123, the pretreatment agent head 121, and the dye-transfer suppression agent head 124 may be arranged in corresponding order. Further, the pretreatment agent head 121, the white head 122, the color head 123, and the dye-transfer suppression agent head 124 may be arranged in corresponding order. Further, the dye-transfer suppression agent head 124, the white head 122, the color head 123, and the pretreatment agent head 121 may be arranged in corresponding order.

Effects of Embodiments

The printing apparatus 1 of the first aspect of the present disclosure includes the pretreatment agent head 121 configured to eject, to the fabric 3, the pretreatment agent including the dye-transfer suppression agent for suppressing the dye or the pigment dyeing the chemical fibers constituting the fabric 3 from transferring to a print surface formed on the fabric 3. The printing apparatus also includes the white head 122 and the color head 123 configured to eject inks for forming the print surface to the area 3A where the dye-transfer suppression agent is ejected. Therefore, in the printing apparatus 1, the pretreatment agent head 121 ejects the dye-transfer suppression agent to the fabric 3, so that the dye-transfer sublimation that the dye or the pigment dyeing the chemical fibers transfers to the print surface formed on the fabric 3 can be suppressed and various images can be printed. In addition, the printing apparatus 1 of the second aspect of the present disclosure includes the dye-transfer suppression agent head 124 configured to eject, to the fabric 3, the dye-transfer suppression agent for suppressing the dye or the pigment dyeing the chemical fibers constituting the fabric 3 from transferring to the print surface formed on the fabric 3. The printing apparatus also includes the white head 122 and the color head 123 configured to eject inks for forming the print surface to the area 3A where the dye-transfer suppression agent is ejected. Therefore, in the printing apparatus 1, the dye-transfer suppression agent head 124 ejects the dye-transfer suppression agent to the fabric 3, so that the dye-transfer sublimation that the dye or the pigment dyeing the chemical fibers transfers to the print surface formed on the fabric 3 can be suppressed and various images can be printed.

The pretreatment agent head 121 is configured to eject the dye-transfer suppression agent including a resin component or having a color to the area 3A where the white head 122 and the color head 123 eject ink. Therefore, since the dye-transfer suppression agent is ejected to the area to which the inks are ejected, the dye-transfer suppression agent is not ejected to an area to which the inks are not ejected, except the area 3A. Therefore, when the dye-transfer suppression agent includes a resin component or the dye-transfer suppression agent is colored, a conspicuous application mark of the dye-transfer suppression agent is reduced.

The printing apparatus 1 of the second embodiment includes the white head 122, the color head 123, and the pretreatment agent head 121 configured to eject the pretreatment agent to the area 3A to which the white ink is ejected from at least the white head 122, before the dye-transfer suppression agent head 124 ejects the dye-transfer suppression agent. Therefore, since the pretreatment agent is ejected before the dye-transfer suppression agent is ejected to the area 3A and then the dye-transfer suppression agent is ejected, it is possible to suppress the dye or the pigment dyeing the chemical fibers from transferring to the white ink. Therefore, a clear image is printed even when the white ink is ejected. The printing apparatus 1 of the third embodiment includes the white head 122, the color head 123, and the pretreatment agent head 121 configured to eject the pretreatment agent to the area 3A after the dye-transfer suppression agent head 124 ejects the dye-transfer suppression agent. Therefore, since the pretreatment agent is ejected after the dye-transfer suppression agent is ejected to the area 3A, the same effects as the printing apparatus 1 of the second embodiment can be realized.

Further, the printing apparatus 1 of the second embodiment includes the heater 4 configured to perform the heat treatment for the fabric 3, and the heater 4 is configured not to perform the heat treatment after ejection of the pretreatment agent but to perform the heat treatment after ejection of the dye-transfer suppression agent. In this case, film formation of the pretreatment agent and fixing of the dye-transfer suppression agent by the heat treatment can be performed at the same timing. Therefore, the treatment time is shortened, as compared to a case where the film formation of the pretreatment agent and the fixing of the dye-transfer suppression agent are separately performed by the heat treatment.

Further, the printing apparatus 1 includes the dye-transfer suppression agent head 124 configured to eject the dye-transfer suppression agent, and the carriage 13 configured to mount thereon the dye-transfer suppression agent head 124, the white head 122, and the color head 123. Therefore, since the dye-transfer suppression agent head 124, the white head 122 and the color head 123 are mounted on the same carriage 13, a positional deviation between a dye-transfer suppression agent ejection area and an ink ejection area is reduced.

The dye-transfer suppression agent includes porous fine particles (for example, activated carbon, zeolite, or MOF) having an adsorption property. In this case, the fine particles having the adsorption property can capture the dye or the pigment and suppress the dye-transfer sublimation.

Since the dye-transfer suppression agent includes activated carbon, the cost of the dye-transfer suppression agent can be reduced by using the low-cost activated carbon.

Further, the printing apparatus 1 includes the heater 4 configured to perform the heat treatment for the fabric 3 and the CPU 81 as a controller, and the CPU 81 performs the preheating treatment (S5) for the fabric 3 before the white ink is ejected from the white head 122 to the fabric 3, ejects the color ink from the color head 123 to the fabric 3 after the preheating treatment, and thereafter performs the main heating treatment (S10), which takes longer than the preheating treatment. Therefore, by performing the preheating treatment and the long-time main heating treatment, it is possible to suppress the dye or the pigment dyeing the chemical fibers from transferring to the white ink layer by the dye transfer suppression member while improving an image quality.

Further, the CPU 81 of the printing apparatus 1 is configured to change the amount of the dye-transfer suppression agent that is ejected from the dye-transfer suppression agent head 124, based on the material of the fabric 3. In this case, when the fabric 3 is made of a material in which it is difficult for the dye or the pigment to transfer to the print surface formed on the fabric 3, an amount of the dye-transfer suppression agent is reduced. Therefore, it is possible to reduce a possibility that the dye-transfer suppression agent will be ejected more than necessary.

Further, the CPU 81 of the printing apparatus 1 is configured to extract a position where the color of the image formed in the area 3A of the fabric 3 has a density value larger than a predetermined density, and to change the amount of the dye-transfer suppression agent, which is ejected from the dye-transfer suppression agent head 124 to the fabric 3, depending on the position on the print surface, in the second dye-transfer suppression agent ejection processing. In this case, since the amount of the dye-transfer suppression agent to be ejected can be reduced, depending on the position on the print surface, the amount of the dye-transfer suppression agent can be saved and the cost can be thus reduced.

At a position where the color of the image formed by the color ink has a density value larger than the predetermined density value or a brightness value smaller than a predetermined brightness, the CPU 81 may reduce the amount of the dye-transfer suppression agent, which is ejected from the dye-transfer suppression agent head 124 to the fabric 3, to a predetermined amount or smaller. In this case, since a part where a printed color is deep or dark is less susceptible to an influence of an appearance of dye-transfer sublimation, the cost can be reduced by reducing the amount of the dye-transfer suppression agent.

An image forming method that is executed by the printing apparatus 1 of the present disclosure includes a step of dye-transfer suppression agent ejection processing (S3) of causing the dye-transfer suppression agent to be ejected from the dye-transfer suppression agent head 124 to the fabric 3, and a step of color ink ejection processing (S8) of causing the color ink for forming a print surface to be ejected from the color head 123 to the area 3A in which the dye-transfer suppression agent is ejected. Therefore, in the image forming method, the dye-transfer suppression agent head 124 ejects the dye-transfer suppression agent to the fabric 3, so that the dye or the pigment dyeing the chemical fibers can be suppressed from transferring to the print surface formed on the fabric 3 and various images can be printed.

The present disclosure is not limited to the above embodiment, and can be variously changed. For example, the acquisition processing (S21) of the material information on the medium to be printed in the first dye-transfer suppression agent ejection processing shown in FIG. 9 is not limited to the acquisition of the information on the material of the medium to be printed input from the operation unit 85, and the CPU 81 may use AI (Artificial Intelligence) or the like to determine the material of the fabric 3 from image data obtained by capturing the fabric 3 and input from the digital camera 101 (refer to FIG. 4). In addition, the CPU 81 may acquire the material information of the fabric 3 included in the print data.

Further, in the second print processing, the dye-transfer suppression agent ejection processing (S3) may also be performed before the pretreatment agent ejection processing (S2). In the first print processing and the second print processing, the heating treatment is performed twice, i.e., the preheating treatment (S5) and the main heating treatment (S10), but is not necessarily limited to two times. The platen conveying processing (S4) and the preheating treatment (S5) are not necessarily required to be performed. The main heating treatment (S10) may also be performed only once. In this case, the working time is shortened and the productivity is improved. Further, the heating treatment may also be each performed after ejection of the pretreatment agent, after ejection of the dye-transfer suppression agent, after ejection of the white ink, and after ejection of the color ink. In this case, each liquid is fixed, and therefore, the image quality is improved.

Further, the alignment of the pretreatment agent head 121, the dye-transfer suppression agent head 124, the white head 122 and the color head 123 in the sub-scanning direction on the carriage 13 is not limited to the first to third embodiments. For example, the pretreatment agent head 121 may be arranged behind the color head 123. In a case where the alignment of the heads is different from the first to third embodiments, the CPU 81 may move the platen 31 according to the alignment of the heads, and eject the pretreatment agent, the dye-transfer suppression agent and the inks from each of the heads to the area 3A on the fabric 3. Further, the heads 121 to 124 may be mounted on separate carriages, respectively. A pretreatment unit configured to perform a pretreatment for the fabric 3 may be provided separately from the printing unit 2 configured to eject the white ink and the color ink, and the heater 4 may be provided between the pretreatment unit and the printing unit 2.

Further, in the processing of S24 of the first dye-transfer suppression agent ejection processing shown in FIG. 9 and the processing of S34 of the second dye-transfer suppression agent ejection processing shown in FIG. 10, the amount of the dye-transfer suppression agent to be ejected may be increased to an amount larger than a preset value. In this case, the effect of suppressing the dye-transfer sublimation can be improved. Further, the color head 123 is not limited to the four colors of black (K), yellow (Y), cyan (C), and magenta (M). A nozzle configured to eject another color may also be provided. Further, the color head 123 may be three colors of yellow (Y), cyan (C), and magenta (M). Further, the color head 123 may be a head of any one color or a plurality of colors. Further, the heater 4 is not limited to the heat press, and may be an oven, a hot air blower, or the like. Further, instead of ejecting the dye-transfer suppression agent from the dye-transfer suppression agent head 124, potting, doming, dispenser application or the like may be used. Further, the porous fine particles included in the dye-transfer suppression agent are not limited to activated carbon, zeolite, or MOF, and may be any fine particles having an adsorption property. In addition, the dye-transfer suppression agent may include a plurality of types of porous fine particles.

Note that, in the first to third embodiments, the platen 31 is configured to move in the sub-scanning direction, and the carriage 13 on which the printing head 12 is mounted is configured to move in the main scanning direction. However, the present disclosure is not limited thereto. The platen 31 may be configured not to move and the carriage 13 may be configured to move in the main scanning direction and in the sub-scanning direction. Further, the carriage 13 may be configured not to move and the platen 31 may be configured to move in the main scanning direction and in the sub-scanning direction. Further, the carriage 13 and the platen 31 may be configured to move relative to each other. Further, the platen 31 is not necessarily limited to a flat plate. Further, the dye-transfer suppression agent is not necessarily required to include a resin component. The dye-transfer suppression agent is not necessarily to have a color. Transparent fine particle having an adsorption property may also be used. In this case, the area 3A to which the dye-transfer suppression agent is ejected may be the entire area of the fabric 3. Further, even when the ink is ejected over the entire area of the fabric 3, the area 3A to which the dye-transfer suppression agent is ejected may also be the entire area of the fabric 3. Further, the CPU 81 may perform the processing of S21 to S25 shown in FIG. 9 and the processing of S31 to S35 shown in FIG. 10 in parallel to change the amount of ejection of the dye-transfer suppression agent. Further, the processing of reducing the amount of ejection of the dye-transfer suppression agent in S33 may be changed according to a density of the ink ejected by the color head 123.

What is claimed is:

1. An image forming apparatus comprising:
   a supplier configured to supply, to a medium to be printed, a dye-transfer suppression agent that suppresses a dye or a pigment dyeing chemical fibers constituting the medium to be printed from transferring to a print surface formed on the medium to be printed, wherein at least one of a platen on which the medium to be printed is placed or the supplier is moved to supply the dye-transfer suppression agent to the medium to be printed;
   an inkjet head configured to eject ink for forming the print surface to an area to which the dye-transfer suppression agent is supplied; and
   a controller configured to change an amount of the dye-transfer suppression agent supplied from the supplier, based on a material of the medium to be printed or based on a position on the print surface of the medium to be printed.

2. The image forming apparatus according to claim 1, wherein the supplier is configured to supply the dye-transfer suppression agent including a resin component or having a color to an area to which the inkjet head ejects the ink.

3. The image forming apparatus according to claim 1, wherein the inkjet head comprises:
   a white head configured to eject white ink; and
   a color head configured to eject color ink, and
   the image forming apparatus comprises a pretreatment agent supplier configured to supply a pretreatment agent to at least an area to which the white ink is ejected from the white head, before, after or at a same time the supplier supplies the dye-transfer suppression agent.

4. The image forming apparatus according to claim 3, further comprising:
   a heater configured to perform a heat treatment for the medium to be printed; and
   a controller configured to perform:
      a preheating treatment, by the heater, for the medium to be printed before ejecting the white ink from the white head to the medium to be printed; and
      to eject the color ink from the inkjet head to the medium to be printed after the preheating treatment, and thereafter to perform a main heating treatment that takes longer than the preheating treatment.

5. The image forming apparatus according to claim 1, further comprising:
   a heater configured to perform a heat treatment for the medium to be printed,
   wherein the heater is configured not to perform the heat treatment after a supply of the pretreatment agent but to perform the heat treatment after the supply of the dye-transfer suppression agent.

6. The image forming apparatus according to claim 1,
   wherein the supplier includes a dye-transfer suppression agent head configured to eject the dye-transfer suppression agent, and
   the image forming apparatus comprises a carriage on which the dye-transfer suppression agent head and the inkjet head are mounted.

7. The image forming apparatus according to claim 1, wherein the dye-transfer suppression agent includes fine particles having an adsorption property.

8. The image forming apparatus according to claim 7, wherein the dye-transfer suppression agent includes activated carbon.

9. The image forming apparatus according to claim 1,
   wherein the controller is configured to reduce an amount of the dye-transfer suppression agent, which is supplied from the supplier to the medium to be printed, to a predetermined amount or smaller at a position where a color of an image formed by the ink ejected from the inkjet head has a density value larger than a predetermined density or a brightness value smaller than a predetermined brightness.

10. An image forming method performed by an image forming apparatus comprising:
    A supplier configured to supply, to a medium to be printed, a dye-transfer suppression agent that suppresses a dye or a pigment dyeing chemical fibers constituting the medium to be printed from transferring to a print surface formed on the medium to be printed, wherein at least one of a platen on which the medium to be printed is placed or the supplier is moved to supply the dye-transfer suppression agent to the medium to be printed
    an inkjet head configured to eject ink for forming the print surface; and
    a controller,
    wherein the image forming method comprises steps of:
       causing the dye-transfer suppression agent to be supplied from the supplier to the medium to be printed; and causing ink for forming the print surface to be ejected to an area to which the dye-transfer suppression agent is supplied, and in the step of causing the dye-transfer suppression agent to be supplied, an amount of the dye-transfer suppression agent supplied from the supplier is changed, based on a material of the medium to be printed or based on a position on the print surface of the medium to be printed.

\* \* \* \* \*